United States Patent [19]

Grauel et al.

[11] Patent Number: 4,573,206
[45] Date of Patent: Feb. 25, 1986

[54] METHOD AND MEANS FOR ALLOCATING THE VOLUME OF TRAFFIC OVER DIFFERENT CONTROL CHANNELS OF A CELLULAR RADIO SYSTEM

[75] Inventors: Christoph Grauel, Feucht, Fed. Rep. of Germany; Philippe Duplessis; Alain Tarabout, both of Velizy Cedex, France

[73] Assignee: U.S. Philips Corporation, New York, N.Y.

[21] Appl. No.: 562,382

[22] Filed: Dec. 16, 1983

[30] Foreign Application Priority Data

Dec. 17, 1982 [DE] Fed. Rep. of Germany ....... 3246742

[51] Int. Cl.$^4$ .......................... H04B 7/00; H04Q 7/02
[52] U.S. Cl. ........................................ 455/33; 455/34; 455/56
[58] Field of Search ................... 455/31.33, 34, 54, 56, 455/38; 179/2 EB

[56] References Cited

U.S. PATENT DOCUMENTS

| | | | |
|---|---|---|---|
| 3,582,787 | 6/1971 | Muller et al. | 455/33 |
| 3,898,390 | 8/1975 | Wells et al. | 455/34 |
| 4,127,744 | 11/1978 | Yoshikawa et al. | 455/54 |
| 4,228,319 | 10/1980 | De Jagger et al. | 179/2 EB |
| 4,360,297 | 11/1982 | Bowen et al. | 455/54 |

FOREIGN PATENT DOCUMENTS

53930 4/1980 Japan ..................... 455/33

*Primary Examiner*—Jin F. Ng
*Attorney, Agent, or Firm*—Thomas A. Briody; William J. Streeter; Leroy Eason

[57] ABSTRACT

A cellular radio system in which the mobile radio stations in the zone of any base radio station assign themselves to the control channels allocated to that base station so as to evenly spread the volume of traffic over such control channels. The base station transmits on each control channel a channel group code signifying the range of group code numbers allocated to that particular control channel. Each mobile station stores its identifying group code number, scans the group code numbers of all control channels, and assigns itself to the control channel having a channel group code which includes its group code number. The spread of traffic over the various control channels can be changed by the base radio station simply by changing the channel group codes of the various control channels, without addressing specific commands to the mobile radio station.

11 Claims, 2 Drawing Figures

METHOD AND MEANS FOR ALLOCATING THE VOLUME OF TRAFFIC OVER DIFFERENT CONTROL CHANNELS OF A CELLULAR RADIO SYSTEM

BACKGROUND OF THE INVENTION

1. Field of the Invention

The invention concerns a process for spreading the volume of traffic over different control channels of a radio transmission system, and apparatus for practicing such a process.

2. Description of the Prior Art

In a radio communications system (radio transmission system) known from DE-AS 27 33 503 the service area (the entire primary coverage area) is divided up into a large number of zones (radio zones) (cellular system) and each radio zone is allocated at least one control channel (organisation channel) and several traffic channels. In a radio zone with a large number of mobile telephone subscribers (mobile radio stations) the transmitter/receiver in the radio station (base) has to be provided with several control channels. To simplify the transmission and reception separation filter the transmission and reception frequency band is split up into an upper and a lower band. The mobile radio stations are divided up into at least two groups each of which uses one of the transmission and reception frequency bands. The division of the transmission and reception frequency band into two bands is chosen so that both groups of mobile radio stations share a common band. At least some of the control channels are located in this common band.

A mobile radio station of a first group selects a control channel, e.g. for the establishment of connections. To this end the mobile radio station scans the control channels allocated to the first group for one with a good signal-to-noise ratio. If the signal-to-noise ratio of the selected control channel deteriorates because of interference to the radio field propagation or for some other reason, then the mobile radio station, on receipt of a certain control channel code, can also use a control channel allocated to another group, e.g. the second group. This allocation of control channels of another group is only undertaken in a radio zone if it has a small number of mobile radio stations.

If there are several control channels available in a radio zone, then the volume of traffic corresponding to the mobile radio stations located and registered as being in this radio zone is spread over the control channels of this radio zone. In the known radio transmission system (DE-AS 27 33 503) the mobile radio stations are split up into groups to reduce the cost of the transmitter and receiver separation filter. Regard for the traffic situation, in particular a system of control by spreading the volume of traffic over different control channels, is neither anticipated nor mentioned. If four control channels are allocated to a radio zone, for example, and if there are in that radio zone only two out of a total of four groups of mobile radio stations, then the volume of traffic in the zone is spread over two control channels allocated to only the two groups of mobile radio stations.

If the number of control channels in a radio zone belonging to that radio zone or the frequency and consequently the channel number of a control channel changes, then the mobile radio stations should automatically and independently assign themselves to the thus formed new set of control channels. If, for example, a new control channel is allocated to the radio zone, then everything possible should be done to prevent the already existing control channels and the new control channel from becoming temporarily overloaded in the short term by a large number of individual transfers of mobile radio stations.

The problem underlying the invention was to devise a process for spreading the volume of traffic over different control channels of a radio zone. In the event of a change in configuration, i.e. in the event of a control channel failure, the mobile radio stations should require no individual change commands to a new control channel.

SUMMARY OF THE INVENTION

The process in accordance with the invention provides the means for an approximately uniform spread of the volume of traffic over different control channels of a radio zone of a radio transmission system.

Some of the many mobile radio stations are in radio contact with the base radio station.

If the case of the known radio transmission system (DE-AS 27 33 503) when it comes to an establishment of connections from the base radio station to the mobile radio station the latter has to be called on all the control channels in the radio zone. This unnecessary overloading of all the control channels can be avoided by the process according to the invention. At the same time the number of transfers of mobile radio stations on an overloaded control channel can be kept low. The volume of traffic on the different control channels at any one time can be determined in the base radio station by traffic metering. The variable number of groups in the radio transmission system known to both the base radio station and the mobile radio station is chosen so that in each radio zone the various groups are spread as evenly as possible. The number of groups (ntp) shows into how many groups the total number of mobile radio stations located in the radio coverage area of the base radio station have been divided. The mobile radio station can assign itself to a control channel in a clear-cut fashion by combining the group code number with the number of groups and group code transmitted via the control channel. The group code (atp) in a control channel shows which groups of mobile radio stations are allowed to use that channel. By changing it the base radio station has a simple means of controlling the spread of the volume of traffic over its different control channels.

Advantageous versions of the invention are described in the subclaims.

DESCRIPTION OF THE PREFERRED EMBODIMENTS

Figure 1:
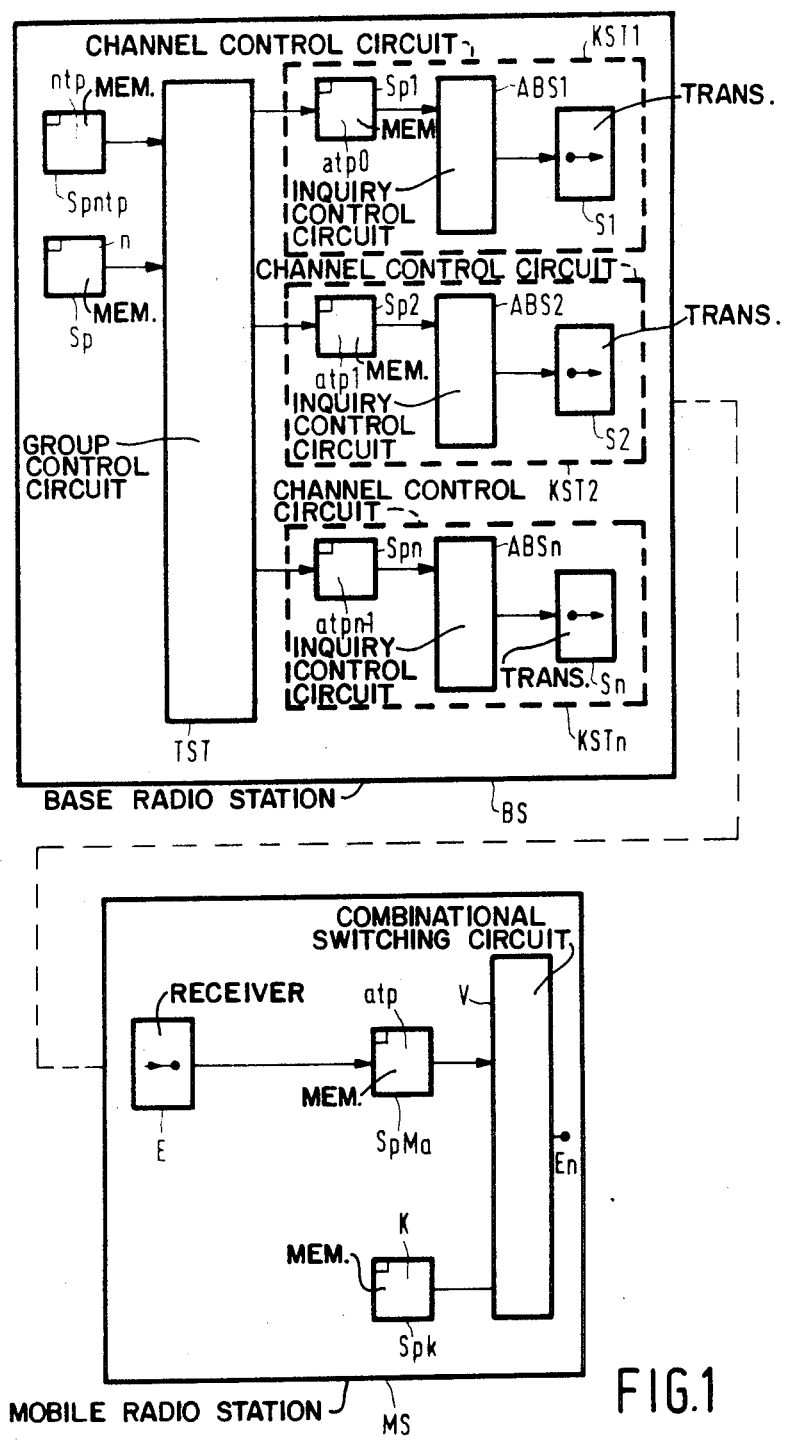
FIG. 1 is a circuit block diagram of a radio transmission system comprising a base radio station and a mobile radio station in accordance with the invention.

The invention will now be described in greater detail and explained for different cases.

The radio transmission system is made up of several levels that are built up on top of one another. The lowest level consists of what are known as radio zones.

Depending on the height of the aerial masts of the base radio stations BS and with a transmitter power of a maximum of 50 watts the radius of these radio zones can lie between 5 and 15 km. Each radio zone is covered by a base radio station BS, which can relay conversations from and to the public telephone network via radio relay equipment. Several adjoining radio zones can be combined into what is known as a paging area. The locations of all the mobile radio stations MS are subject to constant monitoring by the base station where they are stored in an address book. If a mobile radio station MS changes its paging area, then a change is made in the address book.

If a telephone subscriber of a public telephone network wishes to contact a mobile radio station MS a selective call is transmitted in all the radio zones of the paging area in which the mobile radio station MS is registered at that moment.

The transmission and reception frequency bands lie, for example, between the 860 and 960 MHz. The duplex distance between transmission and reception frequency bands can be 45 MHz and each transmission and reception frequency band can be subdivided into channel widths of 25 kHz. The channels are used in duplex operation. Depending on the volume of traffic each radio zone of the radio transmission system is allocated a number of traffic channels and at least one control channel CCH. This means that in geographically adjoining radio zones different frequencies (control channels) are used. To distinguish between a control channel CCH and a traffic channel each of them is given a special code. If a control channel CCH fails or is subject to interference any traffic channel can take over the functions of the control channel CCH by a change in code. In this way it is possible to dispense with the duplication of control channels CCH that would otherwise be necessary for reasons of reliability.

In the radio transmission system known from DE-AS 27 33 503 a mobile radio station, once switched on, runs an orientational search for the control channel with the best signal-to-noise ratio. The channel number of this control channel is stored and the mobile radio station goes into a state of rest. The mobile radio station monitors the signal-to-noise ratio of this control channel. If the signal-to-noise ratio of the control channel stored at that moment falls below a given value, then the mobile radio station scans other control channels in a search mode and compares the signal-to-noise ratios. A change in radio zone can be identified by this comparison and the mobile radio station stores the channel number of the corresponding control channel. Accordingly there are mobile radio stations in a radio zone which are ready to transmit and receive or which at a given moment establish connections with the public telephone network or with a mobile radio station of the radio transmission system via the control channel CCH, base radio stations and radio relay equipment. In the known radio transmission system (DE-AS 27 33 503) the mobile radio station stores the control channel that has the highest signal-to-noise ratio. In this way, according to the traffic situation, the volume of traffic on different control channels of a radio zone may vary.

In the radio transmission system all the mobile radio stations MS located in its area are divided up into a constant number ntp of groups TP. Each mobile radio station is permanently and unequivocally allocated to one of these groups TP. To simplify the description it is assumed in the following that the mobile radio stations MS are divided into 100 groups TP. Each mobile radio station is identified by a group code number K which is part of a stored identification code mid of such mobile radio station MS. A mobile radio station MS may be allocated to one of the groups TP on the basis, for example, of the last two figures y z of its identification code mid. The allocation criterion mtp is then the same as the two final figures y z. A mobile radio station MS with an identification code 59988 accordingly belongs to the group TP=88. The base radio station BS transmits a group code atp to the mobile radio stations MS on each control channel CCH. By comprising the received group code atp and its stored group code number K the mobile radio station MS can derive an unequivocal allocation to a control channel CCH. The group code atp transmitted by the base radio station BS to the mobile radio stations MS can, for example, consist of two parts, a largest and a smallest identification code number ltp and ftp. A mobile radio station MS assigns itself to that control channel CCH for which the condition $$ftp \leq mtp \leq ltp$$

is satisfied. In the examples below mtp will be taken as being equal to K.

Case 1

At a given moment three control channels CCH 1, 2 and 3 are allocated to a radio zone, with the channel numbers 589, 614 and 765. The volume of traffic in the radio coverage area of the base radio station BS is evenly spread if each such control channel carries a third of the volume of traffic. In the group code atp transmitted on control channel CCH1 (with the channel number cnr=589) the base radio station BS makes it known that the smallest identification code number ftp=00 and the largest identification code number ltp=32. On control channel CCH2 (with the channel number cnr=614) the base radio station BS transmits to the mobile radio station MS a smallest number ftp=33 and a largest number ltp=65. Correspondingly on control channel CCH3 (with the channel number cnr=765) a smallest number ftp=66 and a largest number ltp=99. The mobile radio station MS with the group code number K=88 (identification code 59988) assigns itself to control channel CCH3 because the condition $$66 \leq 88 \leq 99$$

is satisfied for this channel. The channel number cnr=765 of control channel CCH3 can be stored in the mobile radio station MS. Because of this unequivocal allocation the mobile radio stations MS can be paged by the base radio station BS on control channel CCH3.

Having been switched on each mobile radio station MS so assigns itself to a control channel CCH of a radio zone. In the subsequent course of events the mobile radio station MS continually checks that the condition for this control channel CCH is satisfied. If this condition ceases to be satisfied then a search begins in the mobile radio station MS for a new control channel CCH which satisfies the condition at that moment. If several control channels CCH satisfy this condition, then the mobile radio station MS will, as a matter of preference, assign itself to the one with the highest signal-to-noise ratio or to the one received with the greatest field strength. If the base radio station BS transmits a code for the paging area in addition to the group code atp, then a change of paging area can be identified in the mobile radio station MS. Only when the mobile radio station MS recognises such a change will there be any rerouting via the chosen control channel CCH of the new paging area.

As a means of controlling the spread of the volume of traffic over its control channels the base radio station BS can change the largest and smallest numbers ltp and ftp. An uneven spread of the volume of traffic can be ascertained in the base radio station BS by traffic metering on the control channels CCH. In addition to the advantage that specific change commands are unnecessary for each individual mobile radio station MS when the largest and smallest numbers ltp and ftp change, there is the advantage of a reduction in the volume of traffic on the individual control channels CCH. In a radio zone a page to a particular mobile radio station MS must only be transmitted on one control channel CCH, since the mobile radio station MS, if at all, will have assigned itself to one particular control channel CCH of this radio zone.

Case 2

In this example it is assumed that the volume of traffic is divided up into the following proportions: 40% on control channel CCH1, 40% on control channel CCH2 and 20% on control channel CCH3. Therefore, the base radio station BS reallocates the volume of traffic so the smallest identification code number ftp is set as 00 and the largest identification code number ltp as 39 on control channel CCH1, the smallest number ftp=40 and the largest number ltp=79 on control channel CCH2 and the smallest number ftp=80 and the largest number ltp=99 on control channel CCH3. As a result of the change in the largest and smallest numbers ltp and ftp mobile radio stations MS with a group code number K of 33 to 39 change from control channel CCH 2 and assign themselves to control channel CCH1. Mobile radio stations MS with a group code number K of 66 to 79 (previously control channel CCH3) assign themselves to control channel CCH2.

Case 3

A change in configuration of the control channels CCH becomes necessary if, for instance, a control channel CCH fails. In this example it has been assumed that control channel CCH2 fails and the base radio station BS or radio relay equipment designates a control channel with channel number 623 as a substitute. The new control channel CCH2 with channel number cnr=623 (previously control channel CCH2 with channel number cnr=614) takes over the functions of the failed control channel CCH2 by transmitting identifying codes ranging from the smallest number ftp=33 to the largest number ltp=65 to the mobile radio stations MS.

Case 4

As in case 3 it is assumed here that control channel CCH2 fails, with the difference that the base radio station BS or the radio relay equipment does not designate any new control channel CCH2 as a substitute. The base radio station BS transmits the smallest identifying code number ftp=00 and the largest identifying code number ltp=49 on control channel CCH1 (with channel number cnr=589). And on control channel CCH 2 (with channel number cnr=765, previously control channel CCH3) the base radio station BS transmits the smallest number ftp=50 and the largest ltp=99. The volume of traffic is therefore spread equally over control channels CCH1 and CCH2. The mobile radio stations MS, which had previously assigned themselves to control channel CCH2, now spread themselves over control channels CCH1 and CCH2 in equal amounts. Mobile radio stations MS that have and reassign themselves find their new channel after a search.

It is assumed here that the base radio station BS transmits a 16 bit word as the group code atp on two control channels CCH1 and CCH2. The number of mobile radio stations located in the radio coverage area of the radio transmission system is divided into 16 groups TP in accordance with a number of groups ntp=16.

The allocation criterion mtp is calculated in each mobile radio station MS. That is, for example. the remainder of the division of the stored group code number K by the number of groups ntp. Thus, the mobile radio station MS with the group code number K=88 determines the criterion mtp to be equal to 8 (i.e., the remainder of 88/16).

If the base radio station BS transmits a group code $$atp = 1111\ 1111\ 0000\ 0000$$

on control channel CCH1 and a group code $$atp = 0000\ 0000\ 1111\ 1111$$

on control channel CCH2, the smallest figure ftp and largest figure ltp of control channel CCH1 are 0 and 7 respectively (on control channel CCH2 ftp=8 and ltp=15). The mobile radio station MS with the criterion mtp=8 consequently assigns itself to control channel CCH2.

In this example the first bit of the group code atp is allocated the criterion mtp=0, the second bit the criterion mtp=1, etc., last bit being allocated the criterion mtp=15. The mobile radio stations MS assign themselves to a particular control channel CCH if such channel has, e.g., a logical 1 characteristic state at the bit location of the group code atp allocated to the criterion mtp. The mobile radio station MS for which mtp=8 therefore assigns itself from the above information to control channel CCH2.

The described spread of the volume of traffic over different control channels can be varied in steps.

FIG. 1 shows a control device in the form of a block diagram. The base radio station BS contains memories Sp and Spntp, whose outputs are each connected to an input of a group control circuit TST, and n channel control circuits KST1 to KSTn, corresponding to the number n of allocated control channels CCH.

Each channel control circuit (e.g. KST1) has a first memory Sp1, whose input is connected to an output of the group control circuit TST and whose output is connected to an input of an inquiry control circuit ABS1. The output of the inquiry control circuit ABS1 is connected to the input of a transmitter S1.

Located in the mobile radio station MS are a receiver E and a first memory SpMa, whose output is connected to an input of a combinational switching circuit V.

The mobile radio station also contains a second memory SpK, whose output is connected to an input of the combinational switching circuit V.

Stored in the base radio station BS in the memory Sp is a number n equal to the number of control channels CCH allocated to the base radio station BS and in the memory Spntp the number of groups ntp of mobile stations. The two numbers n and ntp are fed to the group control TST which derives a group code atp for each control channel from these members, which is stored in the memory Spm (m=1, ... n) of the associated channel control KSTm.

The group codes atp are read out and fed to the associated transmitter Sn by means of the inquiry control ABSn.

The transmitted group code atp is received in the receiver E located in the mobile radio station MS and is fed to the first memory SpMa. The stored group code atp is compared with the identifying group code number K of station MS stored in the second memory SpK by the combinational switching circuit V. Such comparison is made as described above. Available at a terminal En of the combinational switching circuit V is a control signal for allocating the mobile radio station MS to one of the control channels CCH.

Figure 2:
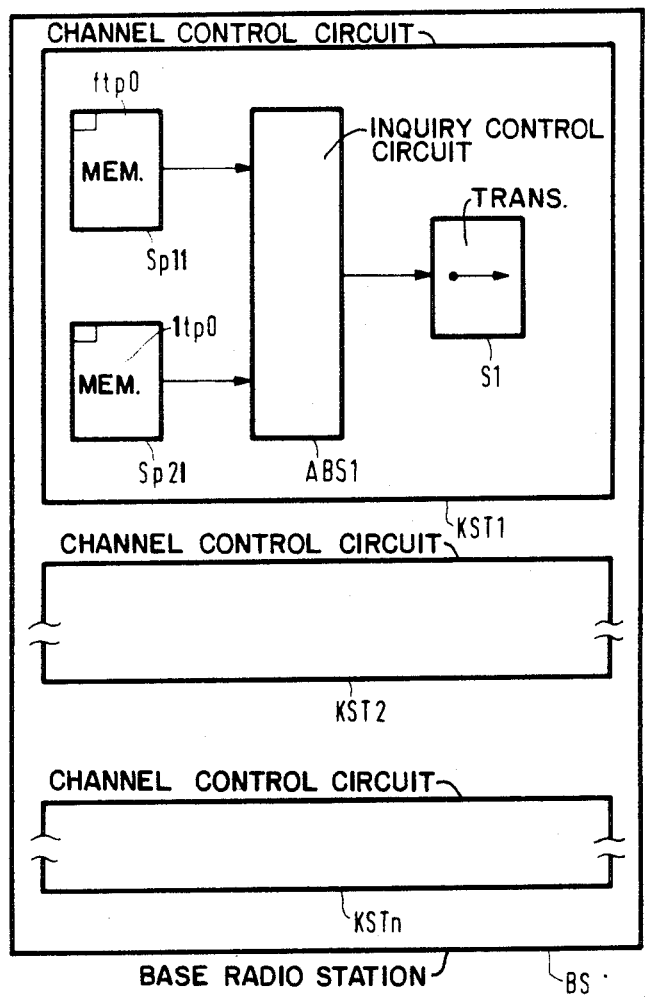
FIG. 2 is a circuit block diagram of an alternative form of base radio station in the circuit of FIG. 1.

FIG. 2 shows a a modified version of the system in FIG. 1 in which each channel control circuit KSTn (n=1, ... n) of the base radio station BS is provided with two memories Sp11 and Sp21. A smallest number ftp is stored in the first memory Sp11 and in the second memory a largest number ltp. These two numbers are used for the group code atp, as described above. The two memories Sp and Spntp and the group control circuit TST in the base radio station BS in FIG. 1 are unnecessary in this modified version of the system therein.

What is claimed is:

1. A process for spreading the volume of traffic over different control channels of a radio communication system in which a plurality of base radio stations form a cellular system of radio zones in a geographical arrangement, the base radio station of each zone having a plurality of control channels and traffic channels allocated thereto over which it communicates with a plurality of mobile radio stations in such zone, such process comprising:

dividing the total number of mobile radio stations in the radio communication system into a number of groups (ntp) identified by respective channel group codes (atp), each such channel group code (atp) corresponding to a range of identifying group code numbers (K);

storing in each mobile radio station (BS) a particular identifying code number (K) which identifies such mobile radio station (BS);

transmission by each base radio station (BS) of respective channel group codes (atp) on the respective control channels (CCH) allocated to it, and reception from such control channels (CCH) of such channel group codes (atp) by the mobile radio stations (MS) in the zone of such base radio station (BS);

causing each mobile radio station (MS) to compare the channel group codes (atp) received thereby with the identifying code number (K) stored therein to select the channel group code (atp) which corresponds to such stored identifying code number (K);

and causing each mobile radio station (MS) to assign itself to the control channel (CCH) which corresponds to the channel code group (atp) selected by such mobile radio station (MS).

2. A process as in claim 1, in which the identifying code number (K) stored in any mobile radio station (MS) is part of a complete identification code (mid) which is stored in such mobile radio station (MS).

3. A process as in claim 2, in which the group code number (K) is derived from the final two figures (yz) of the identification code (mid) stored in the mobile radio station (MS).

4. A process as in claim 1, in which the base radio station (BS) transmits a largest and a smallest number (1tp and ftp) to the mobile radio stations (MS) as part of each channel group code (atp).

5. A process as in claim 1, in which each group code (atp) is in the form of a series of binary digits, the location of each individual binary digit corresponding to a particular identifying code number (K).

6. A process as in claim 1, in which the mobile radio station (MS) derives a criterion (mtp) from its identifying code number (K), and compares the criterion (mtp) with each channel group code (atp) in order to determine the control channel (CCH) to which to assign itself.

7. A process as in claim 6, in which the criterion (mtp) is the remainder of the division of the identifying code number (K) of the mobile radio station (MS) by the number of groups (ntp) into which the total number of mobile radio stations in the radio communication system are divided.

8. A process as in claim 6, in which the criterion (mtp) is the same as the last two figures (yz) of the complete identification code (mid) of the mobile radio station (MS).

9. A process as in claim 1, in which each base radio station (BS) determines the group code (atp) of each of the control channels (CCH) allocated to it.

10. A process as in claim 9, in which the base radio station (BS) determines the group codes (atp) so as to equalize the volume of traffic on all the control channels (CCH) allocated to it.

11. In a radio communication system wherein a plurality of base radio stations form a cellular system of radio zones corresponding thereto in a geographical arrangement, the base radio station of each zone having a plurality (n) of control channels (CCH) and traffic channels allocated thereto over which it communicates with a plurality of mobile radio stations in such zone, the total number of mobile radio stations in the radio communication system being divided into a number of groups identified by respective channel group codes (atp) each of which corresponds to a range of identifying code numbers (K), each base radio station comprising a transmitter and each mobile radio station comprising a receiver; apparatus for spreading the volume of traffic over the control channels allocated to any base radio station (BS), such apparatus comprising:

a plurality (n) of channel control circuits (KST) respectively corresponding to the control channels (CCH) allocated to the base radio station (BS);

each of said channel control circuits (KST) comprising means for storing codes indicating the range of identifying code numbers of one of said channel group codes (atp), whereby respective codes are associated with respective control channels (CCH);

the input of each channel control circuit being connected to the storing means and the output of each channel control circuit being connected to the radio transmitter thereof to convey said stored codes thereto for transmission over such control channel (CCH);

first and second memory means comprised in each of said mobile radio stations (MS), the second memory means of each mobile radio station (MS) storing a code number identifying such mobile radio station (MS);

the receiver in each mobile radio station (MS) being adapted to receive the codes transmitted by the transmitters of all control channels and to convey them to the first memory means comprised in such mobile radio station (MS) for storing therein;

and a combinational switching circuit comprised in each mobile radio station (MS) adapted to compare the stored identifying code number in the second memory means therein with the code stored in the first memory means therein and to produce a control signal signifying the control channel (CCH) corresponding to the identifying code number of said mobile station, such control signal causing such mobile radio station (MS) to allocate itself to such control channel (CCH).

* * * * *